Feb. 28, 1967 G. TSCHANNEN 3,307,115

MEANS FOR LIMITING THE RANGE OF FREQUENCY REGULATION OF OSCILLATORS

Filed Dec. 15, 1964 2 Sheets-Sheet 1

INVENTOR
GOTTFRIED TSCHANNEN

By McGlew and Toren
Attorneys

INVENTOR
GOTTFRIED TSCHANNEN
By McGlew and Toren
Attorneys

United States Patent Office 3,307,115

Patented Feb. 28, 1967

3,307,115

MEANS FOR LIMITING THE RANGE OF FREQUENCY REGULATION OF OSCILLATORS

Gottfried Tschannen, Zurich, Switzerland, assignor to Albiswerk Zürich A.G., a corporation of Switzerland Filed Dec. 15, 1964, Ser. No. 418,421
Claims priority, application Switzerland, Dec. 20, 1963, 15,756/63
13 Claims. (Cl. 331—6)

This invention relates to the frequency regulation of oscillators, particularly of reflex klystron oscillators. More particularly, the present invention is directed to a novel circuit arrangement for limiting the range of action of frequency regulation of oscillators.

As known to those skilled in the art, the oscillation frequency of a reflex klystron oscillator is dependent upon the reflector voltage as well as upon the effective dimensions of the cavity circuit. Furthemore, a feature of reflex klystron oscillators is their capacity to oscillate in a plurality of modes separated from each other by zones of no oscillation.

In most cases, it is desirable to operate the klystron in a preselected mode. Thus, when the "tuning range of the reflector" is mentioned hereinafter, this expression means the range of the reflector voltage related to a mode of oscillation attained with a given setting of the cavity resonator.

Operation of a klystron oscillation in a predetermined mode is generally effected by using a frequency discriminator. If the klystron is detuned by a relatively small amount, its state of operation is called the "following state." In this state, frequency regulation is effected by varying the reflector voltage. However, if the deviation has a magnitude such that it results in a reduction of the power, the cavity setting is changed to reduce the deviation. This state of operation of the klystron is usually referred to as the "searching state."

An object of the present invention is to provide for controlling the frequency of an oscillator and providing a regulation of the reflector voltage automatically within certain limits determined by the mode of oscillation.

Another object of the invention is to provide for regulating the frequency of an oscillator by regulating the reflector voltage automatically within certain limits determined by the mode of oscillation, and further by regulating the oscillator frequency in such a manner that the power reduction at minor detunings is not substantial.

A further object of the invention is to provide for regulating the frequency of an oscillator by regulating the reflector voltage automatically within certain limits determined by the mode of oscillation, when the reflector voltage is outside these limits, initiating the searching state and, after completion of the tuning, switching back to the following state.

Yet another object of the invention is to provide a frequency control circuit for oscillators providing for regulation of the reflector voltage automatically within certain limits determined by the mode of oscillation.

Still another object of the invention is to provide a frequency control circuit for oscillators providing for regulation of the reflector voltage automatically within certain limits determined by the mode of oscillation, and with modulation of the oscillator frequency in such a manner that the power reduction at minor detunings is not substantial.

Yet another object of the invention is to provide a frequency control circuit for oscillators which provides for regulating the reflector voltage automatically within certain limits determined by the mode of oscillation and including additional means effective, when the reflector voltage is outside these limits, to start the searching state and, after tuning has been completed, to switch back to the following state.

To attain these objects the frequency control circuit for performing the method of the invention includes a transistor means in which the base bias and the emitter bias, for the conductive state, are furnished through diodes from the same voltage source. The control voltage is applied, through voltage dividers, to the base and to the emitter, with the voltage dividers having their constants proportioned so that, when the negative range limit is exceeded, the emitter voltage is made equal to the base bias voltage and, when the positive range limit is exceeded, the base voltage is made equal to the emitter bias voltage. The collector current of the transistor means is used to control electronic switching means which either short circuits the control voltage of the oscillator to ground, or interrupts the control voltage, when the range limits are exceeded in either direction.

For an understanding of the principles of the invention, reference is made to the following description of typical embodiments thereof, as illustrated in the accompanying drawings.

Figure 1:
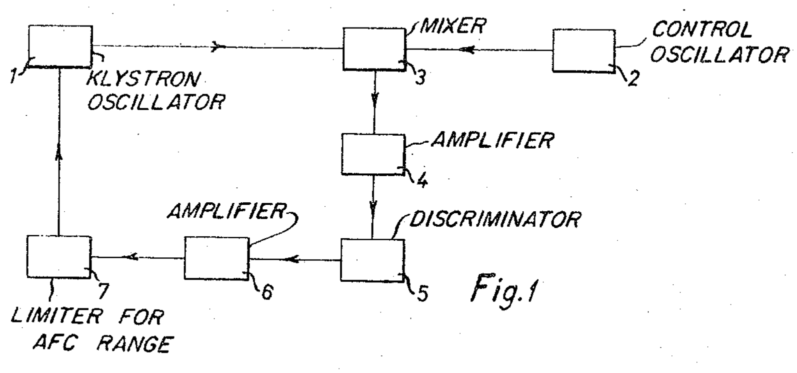
FIG. 1 is a block diagram of a frequency control circuit embodying the invention.

Referring first to the block diagram of FIG. 1, output signals from a reflex klystron oscillator 1 and from a reference or control oscillator 2 are applied to a mixer stage 3. The output signal from mixer stage 3 is amplified in an amplifier 4 and applied to the input of a discriminator 5. The amplified output signal or error voltage derived from the discriminator 5 is amplified in an amplifier 6 and applied through a limiter 7 to the reflex klystron oscillator 1.

Figure 3:
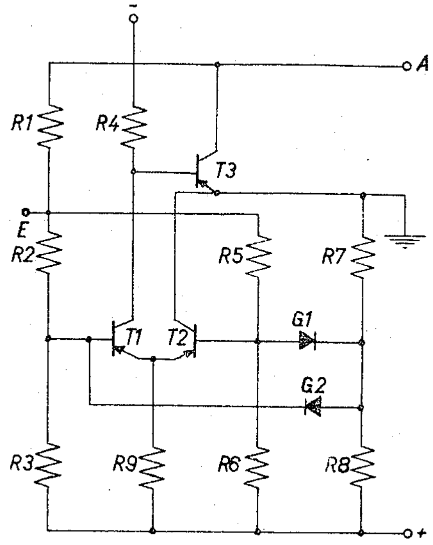
Figure 4:
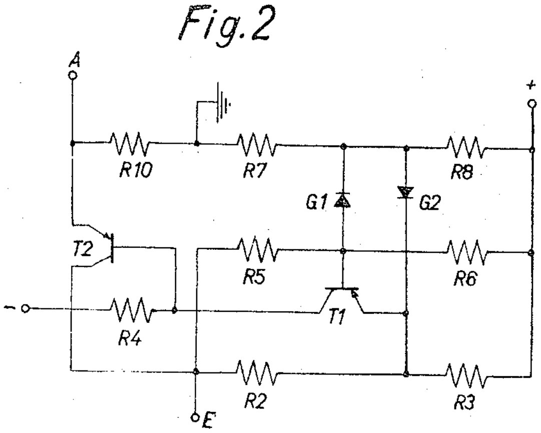

The method of operation of the control circuit of FIG. 1, but without the limiter 7, is known, and a control circuit in this known form, or in a similar known form, is used in all frequency regulation. Thus, the description of the invention, and its illustration in the drawings, can be confined, insofar as details are concerned, to the description and illustration of a limiter 7. Three different embodiments of this limiter are schematically illustrated in FIGS. 2, 3 and 4, respectively.

Figure 2:
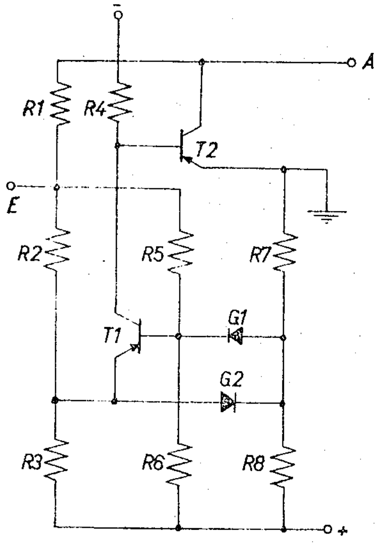
FIGS. 2, 3 and 4 are schematic wiring diagrams of three embodiments of a limiter shown in block form in FIG. 1.

Referring first to FIG. 2, the error voltage from amplifier 6 is applied to the input terminal E, and the limited error voltage fed back to the klystron 1 is tapped from the output terminal A. Between input terminal E and the positive pole of a suitable voltage source there is connected a first voltage divider comprising resistances R2 and R3. The junction point of these resistances is connected to the emitter of a transistor T1 and, through a diode G2, to the junction point of resistances R7 and R8 constituting a second voltage divider connected between the positive pole of the voltage source and ground. A third voltage divider, comprising resistances R5 and R6, is connected between input terminal E and the positive pole of the voltage source. The junction point of resistances R5 and R6 is connected to the base of transistor T1 and, through a diode G1, to the junction point of resistances R7 and R8 constituting the second voltage divider. It will be noted that diodes G1 and G2 are oppositely directed or polarized.

The collector of transistor T1 is connected to the base of a transistor T2, and is also connected to the negative pole of the voltage source through a resistance R4. A resistance R1 is connected between input E and the collector of transistor T2, and this collector is connected to the output A. The emitter of transistor T2 is grounded.

The error voltage or signal at the input terminal E is applied across the voltage divider R2–R3 to the emitter of transistor T1, and across the voltage divider R5–R6 to the base of transistor T1. The two voltage dividers have values such that transistor T1 is conductive when the potential at input E is zero volts. When the potential at input terminal E is equal to the preselected positive or negative potential limit of the following state, translator T1 is blocked or becomes non-conductive.

If, by way of example, the potential limits are preselected to be +3 volts and −3 volts, with the voltage at the positive pole of the voltage source being +20 volts, resistance R7 has a value of 1K ohm and resistance R8 has a value of 2K ohms. The center point or junction of voltage divider R7–R8 has a potential of +6.6 volts. The resistances R5 and R6 have values of 10K ohms and 33K ohms, respectively. Thus, if the potential at input terminal E exceeds +3 volts, the potential at the base of transistor T1 is increased to +7 volts. By virtue of the voltage drop across diode G2, the emitter potential of transistor T1 is +7 volts so that, under such an increase in the potential at input terminal E, transistor T1 becomes non-conductive and is blocked. The values of resistances R2 and R3 are 20K ohms and 30K ohms, respectively. With these values, if the potential at the input terminal E decrease below −3 volts, the emitter potential of transistor T1 is decreased to 6.2 volts. By virtue of the voltage drop across diode G1, the base potential remains at 6.2 volts. Thus, in this case, transistor T1 also becomes non-conductive and is blocked.

With transistor T1 blocked, the base potential of transistor T2 becomes more negative and transistor T2 becomes conductive. With transistor T2 conductive, output terminal A is effectively connected to ground. However, when transistor T1 is conductive, the base of transistor T2 becomes positive so that transistor T2 becomes non-conductive or attains the blocked state. In this case, the output terminal A is effectively connected to the input termnial E through the current limiting resistance R1.

The operation of the limiter circuit shown in FIG. 3 is essentially the same as that of FIG. 2. Control of the blocking or conductive states of transistor T3 is effected by a differential amplifier comprising transistors T1 and T2. The base potentials of both transistors T1 and T2 are derived from the voltage dividers R2–R3 and R5–R6, respectively. These voltage dividers have respective resistance values such that transistor T1 becomes conductive and transistor T2 is blocked when the potential of input terminal E is within the limiting values which are preselected. However, when the potential at input terminal E becomes negative at the lower preselected potential limit, the base potential of transistor T2 becomes more negative and transistor T2 becomes conductive. When transistor T2 becomes conductive, its emitter potential decreases. As the base potential of transistor T1 is maintained by the diode G2, due to the lower emitter potential, transistor T1 is blocked. Thus, the base potential of transistor T3 becomes more negative and transistor T3 conducts to effectively connect output terminal A to ground.

When the potential at input terminal E exceeds the upper value of the potential limit in a positive direction, the base potential of transistor T1 is correspondingly increased. The base potential of transistor T2 is maintained, by diode G1, at a value corresponding to the constants of voltage divider R7–R8, so that the emitter voltages of transistors T1 and T2 are maintained constant. Thus, transistor T1 is blocked and transistor T2 becomes conductive under this condition. Consequently, transistor T3 is again conductive to connect terminal A to ground.

It will thus be observed that the limiter circuits shown in FIGS. 2 and 3 have the effect that, when the voltage at input terminal E exceeds the upper limiting or positive value, or decreases to a negative value below the lower negative limit, output terminal A is short circuited to ground. In some cases, such short circuiting is not desirable. Also, it is feasible that the controlling transistor, such as transistor T2 in FIG. 2 or T3 in FIG. 3, can be so connected as to interrupt the connection between input terminal E and output terminal A when the potentials at input terminal E exceed the limiting value in either direction.

FIG. 4 shows a limiter circuit in accordance with the foregoing, and using generally the circuitry of FIG. 2. The difference is in the method of operation. Thus, in the limiter of FIG. 4, transistor T1 is blocked, within the potential limits, due to the constants of voltage dividers R2–R3 and R5–R6. Diodes G1 and G2 are poled oppositely to those of the arrangement in FIG. 2. Control of transistor T2 by transistor T1 is effected in the same manner as described with respect to FIG. 2. Thus, with transistor T1 blocked, transistor T2 is conductive and connects input terminal E to output terminal A. However, when transistor T1 becomes conductive, transistor T2 is blocked. In such case, output terminal A is effectively disconnected from input terminal E and is connected to ground through resistance R10.

Figure 5:
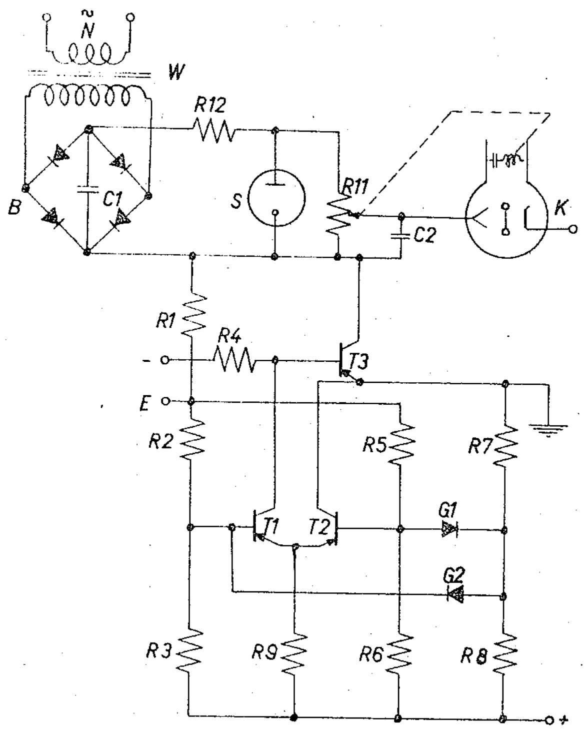
FIG. 5 is a schematic wiring diagram illustrating the limiter of FIG. 3 as applied to a frequency regulation circuit for a klystron oscillator.

FIG. 5 illustrates the limiter circuit of FIG. 3 as applied to the control of a klystron K. The primary winding of a transformer W is connected to a suitable source of A.C. potential N, and the secondary winding of transformer W has connected thereacross the full wave rectifier B which includes a condenser C1. Through the medium of a discharge lamp S, the rectified voltage from rectifier B is stabilized at the output of resistance R11. The reflector voltage of klystron K is derived from the potentiometer R11, with the tapped voltage portion being shunted by condenser C2 to bypass high frequency. Mechanical tuning of the cavity is effected conjointly with adjustment of the tap of potentiometer R11, as indicated by the broken line. The control voltage is applied to the reflector from input terminal E through resistance R1.

With this arrangement, it has been found that, when the control voltage attains a value of from +2 to +3 volts, the cavity resonator is detuned at 10 gHz. by about 5 mHz. from the mode center. As is known to those skilled in the art, regulation by varying the reflector voltage is not admissible with this degree of detuning. With the inventive arrangement, when the voltage determined by the voltage dividers R2–R3 and R5–R6 is exceeded in either direction, transistor T3 becomes conductive and thus connects the positive terminal of rectifier B to ground. The klystron oscillator K oscillates on a frequency determined by the cavity resonator and by the tapped voltage of potentiometer R11.

If the cavity is returned, transistor T3 is blocked only when input terminal E has a potential of zero volts. The klystron is thus automatically tuned to the mode center, and only then does regulation by the reflector voltage become effective again. It will be understood that transistor T3, instead of short circuiting the control voltage to ground, could be connected to a follower servo control means which tunes the cavity and potentiometer 11 to reduce the error voltage to zero volts.

Figure 6:
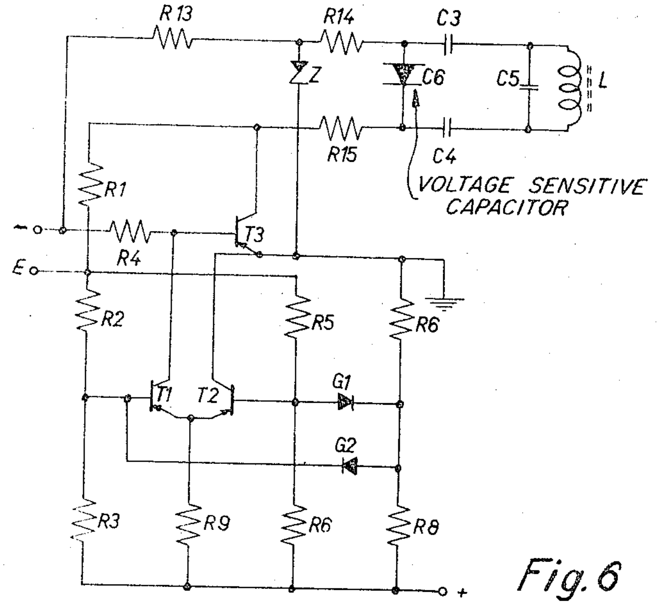
FIG. 6 is a schematic wiring diagram illustrating the limiter shown schematically in FIG. 3 as utilized in a frequency control circuit for an LC oscillator.

FIG. 6 schematically illustrates the application of the limiter circuitry of FIG. 3 to the control of an LC oscillator. In FIG. 6, the oscillator comprises inductance or winding L and capacitance or condenser C5. The control arrangement is coupled to the oscillator through the condensers C3 and C4. A voltage sensitive capacitor, capacity diode, C6 is connected in parallel with condenser C5, but at the opposite sides of condensers C3 and C4. Capacity diode C6 is negatively biased by means of a voltage divider comprising resistances R13 and R14 to the junction points of which there is connected a Zener diode Z. The control voltage or potential at input terminal E is applied to capacity diode C6 through resistances R1 and R15. When either the upper preselected limit or the lower preselected limit of the potential at the input terminal E is exceeded, the control voltage is short circuited to ground through the then conductive transistor T3.

Let it be assumed that the oscillator including the inductance L and the capacitance C5 is the oscillator circuit of a radio receiver for ultra-short waves (HF). In such case, the circuit arrangement acts in the nature of an automatic cut-off device. The control voltage is effective only when the oscillator circuit is tuned to the center of the range. The voltage or potential limits can be set to the channel interval, so that regulation is effective up to a frequency variation of ±300 kHz.

While specific embodiments of the invention have been shown and described in detail to illustrate the application of the principles of the invention, it will be understood that the invention may be embodied otherwise without departing from such principles.

What is claimed is:

1. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; switch means connected to said input and output terminals and controlling effective application of said error voltage at said input terminal as a control voltage to said output terminal and said oscillator; transistor means having an output electrode connected to said switch means; a source of bias potential for said transistor means; means, including voltage divider means, connecting one input electrode of said transistor means to said input terminal and another input electrode thereof to said source of bias potential; said transistor means being effective, when the error voltage applied to said input terminal is within preselected limiting values, to control said switch means to apply said control voltage to said output terminal; said transistor means, when the error voltage applied to said input terminal exceeds said limiting values, controlling said switch means to interrupt effective application of said control voltage to said output terminal.

2. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; switch means connected to said input and output terminals and controlling effective application of said error voltage at said input terminal as a control voltage to said output terminal and said oscillator; transistor means having an output electrode connected to said switch means; a source of bias potential for said transistor means; voltage divider means connecting one input electrode of said transistor means to said input terminal; a voltage divider and diode means connected in series between another input electrode of said transistor means and said source of bias potential; said transistor means being effective, when the error voltage applied to said input terminal is within preselected limiting values, to control said switch means to apply said control voltage to said output terminal; said transistor means, when the error voltage applied to said input terminal exceeds said limiting values, controlling said switch means to interrupt effective application of said control voltage to said output terminal.

3. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; switch means conected to said input and output terminal and controlling effective application of said error voltage at said input terminal as a control voltage to said output terminal and to said oscillator; transistor means including a collector connected, in controlling relation, to said switch means; a source of bias potential for said transistor means; first and second voltage dividers connected between said source of bias potential and said input terminal, and connecting respective input electrodes of said transistor means to said input terminal; a third voltage divider connected to said source of bias potential; and oppositely poled diodes connected between respective input electrodes of said transistor means and said third voltage divider; said transistor means being effective, when the error voltage applied to said input terminal is within preselected limiting values, to control said switch means to apply said control voltage to said output terminal; said control means, when the error voltage applied to said input terminal exceeds said limiting values, controlling said switch means to interrupt effective application of said control voltage to said output terminal.

4. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; switch means connected to said input and output terminals and controlling effective application of said error voltage at said input terminal as a control voltage to said output terminal and to said oscillator; a transistor having its collector connected, in controlling relation, to said switch means; a source of bias potential for said transistor; first voltage divider means connecting said input terminal to the base and to the emitter of said transistor; second voltage divider means connected to said source; and diode means connecting said second voltage divider means to the base and to the emitter of said transistor; the constants of said first and second voltage divider means being such that, when said error voltage is within preselected positive and negative limiting values, said transistor is conductive to control said switch means to apply said control voltage to said output terminal, when said error voltage exceeds the negative limiting value, the emitter voltage of said transistor becomes equal to the base bias thereof and, when said error voltage exceeds the positive value, the base voltage of said transistor becomes equal to the emitter bias thereof; whereby said transistor becomes non-conductive when said error voltage exceeds either the negative limiting value or the positive limiting value to control said switch means to interrupt effective application of said control voltage to said output terminal.

5. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; an electronic switch having a first common connection to said input and output terminals and a second connection to ground; and control means connected to said input terminal and to said electronic switch and effective, when the error voltage applied to said input terminal is within preselected limiting values, to condition said electronic switch effective for application of said error voltage as a control voltage to said output terminal and to the oscillator; said control means, when the error voltage applied to said input terminal exceeds said limiting values, conditioning said electronic switch means to connect said input and output terminals to ground to interrupt effective application of said control voltage to said output terminal.

6. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; an electronic switch means connected in controlling relation with said input terminal, with said output terminal and with ground for controlling effective application of said error voltage as a control voltage to said output terminal and to the oscillator; and control means connected to said input terminal and to said switch means and effective, when the error voltage applied to said input terminal is within preselected limiting values, to control said electronic switch means to establish effective application of said control voltage to said output terminal; said control means, when the error voltage applied to said input terminal exceeds said limiting values, controlling said switch means to establish effective connection of said output terminal to ground.

7. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; an electronic switch means connected in controlling relation with said input terminal, with said output terminal and, through a resistance, with ground, and controlling effective application of said error voltage as a control voltage to said output terminal and to the oscillator; control means connected to said input terminal and to said switch means and effective, when the error voltage applied to said input terminal is within preselected limiting values, to control said electronic switch means to establish effective application of said control voltage to said output terminal; said control means, when the error voltage applied to said input terminal exceeds said limiting values, controlling said electronic switch means to disconnect said input terminal from said output terminal to make effective the connection of said output terminal to ground through said resistance.

8. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; a circuit connecting said output terminal to said input terminal; a transistor having its emitter-collector circuit connected between said output terminal and ground; and control means connected to said input terminal and to the base of said transistor and effective, when the error voltage applied to said input terminal is within preselected positive and negative limiting values, to bias said transistor to the blocking state for effective application of said error voltage as a control voltage to said output terminal and to the oscillator; said control means, when the error voltage applied to said input terminal exceeds either of said limiting values, biasing said transistor to the conductive state to connect said output terminal to ground to interrupt effective application of said control voltage to said output terminal.

9. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; circuit means connecting said output terminal to said input terminal; a switching transistor having its emitter-collector circuit connected between said output terminal and ground; a control transistor having its collector connected to the base of said switching transistor to control the conductivity of said switching transistor; a source of bias potential for said transistors; first and second voltage dividers connected between said input terminal and the emitter and base of said control transistor, respectively, for applying a proportion of the error voltage to the emitter and to the base of said control transistor; a third voltage divider connected to said source of bias potential; oppositely poled diodes connecting the base and the emitter of said control transistor to the same potential point on said third voltage divider; the constants of said voltage dividers being such that (1) when the error voltage applied to said input terminal exceeds a preselected negative limiting value, the emitter voltage of said control transistor becomes equal to the base bias thereof, (2) when the error voltage applied to said input terminal exceeds a preselected positive limiting value, the base voltage of said control transistor becomes equal to the emitter bias thereof and, (3) when the error voltage applied to said input terminal is between said positive and negative limiting values, the emitter voltage of said control transistor is such as to trigger said control transistor conductive; and means connecting the base of said switching transistor to the negative terminal of said source of bias potential; whereby, when the error voltage applied to said input terminal exceeds either said positive limiting value or said negative limiting value, said switching transistor is triggered conductive to connect said output terminal to ground and, when the error voltage applied to said input terminals is between said positive and negative limiting values, said switching transistor is blocked for effective application of said error voltage as a control voltage to said output terminal and to the oscillator.

10. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; circuit means connecting said output terminal to said input terminal; a switching transistor having its emitter-collector circuit connected between said output terminal and ground; a pair of first and second control transistors connected as a differential amplifier; a source of bias potential for said transistors; means connecting the collector of said first control transistor to the base of said switching transistor and to the negative terminal of said source of bias potential; first and second voltage dividers connected between said input terminal and the bases of said first and second control transistors, respectively, to apply to the bases of said control transistors a bias prorportional to the error voltage applied to said input terminal; circuit means connecting the emitters of said first and second control transistors in common to the positive terminal of said source of said bias potential; a third voltage divider connected to said positive terminal; oppositely poled diodes connecting the bases of said first and second control transistors to the same potential point on said third voltage divider; the constants of said voltage dividers being such that, when the error voltage applied to said input terminal exceeds a preselected positive limiting value or a preselected negative limiting value, said first control transistor is biased to the conductive state to trigger said switching transistor to the blocking state to provide for effective application of said error voltage as a control voltage to said output terminal and to the oscillator and, when the error voltage applied to said input terminal exceeds either a preselected negative limiting value or a preselected positive limiting value, said first control transistor is biased to the non-conductive state to trigger said switching transistor to the conductive state to connect said output terminal to ground.

11. In an oscillator whose frequency is regulated responsive to an error voltage corresponding to the direction and magnitude of the oscillator frequency deviation from a preselected value, limiter means for limiting the range of action of the frequency regulation comprising, in combination, an input terminal to which the error voltage is applied; an output terminal connected to the oscillator; a switching transistor having its emitter-collector circuit connected between said input terminal and said output terminal; a resistor connected between said output terminal and ground; a control transistor having its collector connected to the base of said switching transistor; a source of bias potential for said transistors; means connecting the negative terminal of said source to the base of said switching transistor; first and second voltage dividers connected between said input terminal and the emitter and the base of said control transistor, respectively, for applying thereto bias voltages proportional to the error voltage applied to said input terminal; a third voltage divider connected between the positive terminal of said source and ground; and oppositely poled diodes connected between the base and the emitter of said control transistor and the same potential point on said third voltage divider; the constants of said voltage dividers being so selected that, when the error voltage applied to said input terminal is between a preselected positive limiting value and a preselected negative limiting value, the emitter bias of said control transistor is such that the latter is biased to the blocked state to trigger said switching transistor to the conductive state for effective application of said error voltage as a control voltage to said output terminal and to the oscillator and, when the error voltage applied to said input terminal exceeds either said positive limiting value or said negative limiting value, the emitter potential applied to said control transistor is such as to trigger the latter conductive to block said switching transistor to interrupt effective application of said control voltage to said output terminal, whereby the connection of said output terminal to ground through said resistance is made effective.

12. In a reflux klystron oscillator whose frequency is regulated responsive to an error voltage corresponding to the direction and magnitude of the oscillator frequency deviation from a preselected value, by varying the reflector voltage of the klystron oscillator: limiter means for limiting the range of action of the frequency regulation comprising, in combination, a potentiometer having a first and a second terminal, and an adjustable tap connected to the reflector of the klystron oscillator; a source of unidirectional potential having first and second terminals connected to the first and second terminals, respectively, of said potentiometer; an input terminal, to which the error voltage is applied, connected to the first terminal of said potentiometer; an output terminal connected to the first terminal of said potentiometer; a transistor having its emitter-collector circuit connected between said output terminal and ground; and control means connected to said input terminal and to the base of said transistor and effective, when the error voltage applied to said input terminal is within preselected positive and negative limiting values, to bias said transistor to the blocking state for effective application of said error voltage as a control voltage to said output terminal and to said first terminal of said potentiometer; said control means, when the error voltage applied to said input terminal exceeds either of said limiting positive and negative values, biasing said transistor to the conductive state to connect said output terminal and said first terminal of said potentiometer to ground to interrupt effffective application of said control voltage and the voltage of said source to said output terminal and across said potentiometer, respectively.

13. The combination, with an LC oscillator whose frequency is regulated responsive to an error voltage corresponding to the direction and magnitude of the oscillator frequency deviation from a preselected value and limiter means for limiting the range of action of the frequency regulation, said combination comprising, an LC oscillator including an inductance and a capacitance connected in parrallel with each other; a capacity diode; coupling condensers connecting said capacity diode across said oscillator; a source of bias potential; a voltage divider connected between said source and one terminal of said capacity diode to negatively bias said capacity diode; a Zener diode connected between said voltage divider and ground; an input terminal, to which the error voltage is applied; a voltage divider, comprising a pair of resistances, connecting said input terminal to the other terminal of said capacity diode; an output terminal constituted by the junction point of said last-named resistances for applying, to said capacity diode, a control voltage; a transistor having its emitter-collector circuit connected between said output terminal and ground; and control means connected to said input terminal and to the base of said transistor and effective, when the error voltage applied to said input terminal is within preselected positive and negative limiting values, to bias said transistor to the blocking state for effective application of said error voltage as a control voltage to said output terminal; said control means, when the error voltage applied to said input terminal exceeds said limiting positive and negative values, biasing said transistor to the conductive state to connect said output terminal to ground to interrupt effective application of said control voltage to said output terminal and to said capacity diode.

References Cited by the Examiner

UNITED STATES PATENTS

| | | | |
|---|---|---|---|
| 2,713,122 | 7/1955 | Henley | 331—6 |
| 2,897,352 | 7/1959 | Smith-Vaniz | 331—14 X |
| 3,125,728 | 3/1964 | Fasulo | 331—6 |

ROY LAKE, *Primary Examiner.*

J. B. MULLINS, *Assistant Examiner.*